Nov. 15, 1932.  L. C. HESTER  1,888,128

FORESTER'S FIRE LINE PLOW

Filed April 8, 1931    2 Sheets-Sheet 1

WITNESS
Lawrence O. Mankin

INVENTOR
L. C. Hester,
BY
Munn & Co.
ATTORNEY

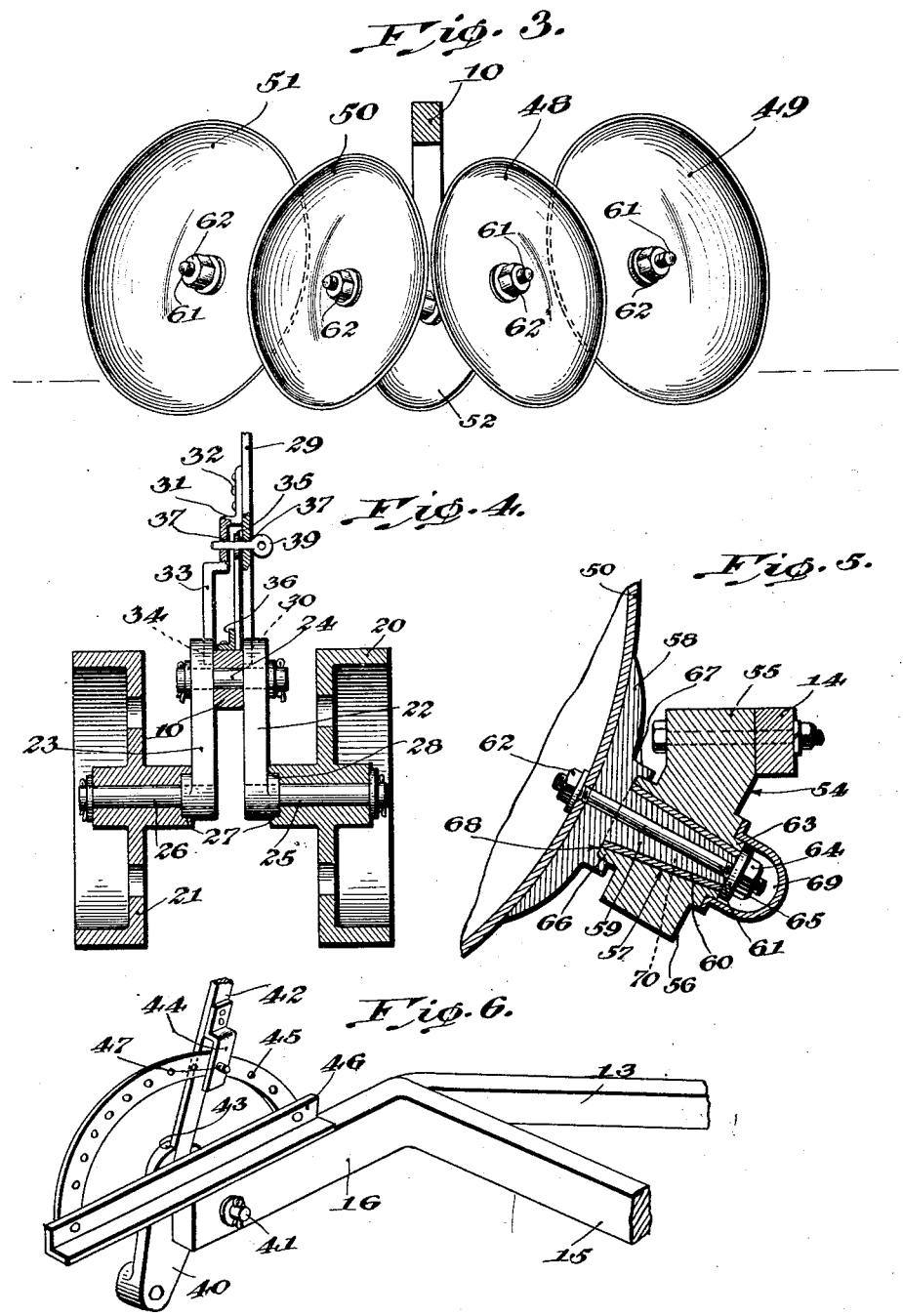

Patented Nov. 15, 1932

1,888,128

UNITED STATES PATENT OFFICE

LEVI C. HESTER, OF JACKSONVILLE, FLORIDA

FORESTER'S FIRE-LINE PLOW

Application filed April 8, 1931. Serial No. 528,694.

My invention relates to plows and particularly to plows adapted for use by foresters and others in the clearing of fire lines to prevent the spread of forest fires.

An object of the invention is to provide a device which will cut and clear a wide swath at one operation.

Another object of the invention is to provide a plow which will remove all vegetation from the path over which it travels and which may be readily adjusted to vary the depth to which the vegetation and top soil is to be removed.

A further object is to provide a wheeled frame provided with means for mounting a plurality of rotatable cutting and scraping disks.

A still further object is to provide a novel and improved form of dirt excluding bearing and mounting for the rotatable disks and the ground wheels of the frame.

Other objects and advantages not specifically mentioned will become apparent during the following detailed description when read in conjunction with the accompanying drawings which form a part of this specification and in which:

Fig. 3 is a frontal view thereof;

Fig. 4 is a vertical sectional view taken on the line 4—4 of Fig. 2;

Fig. 5 is a central vertical sectional view through one of the rotatable disks and the bearing therefor, and Fig. 6 is a perspective view of a portion of the device showing one of the rear wheel adjusting means.

Figure 1:
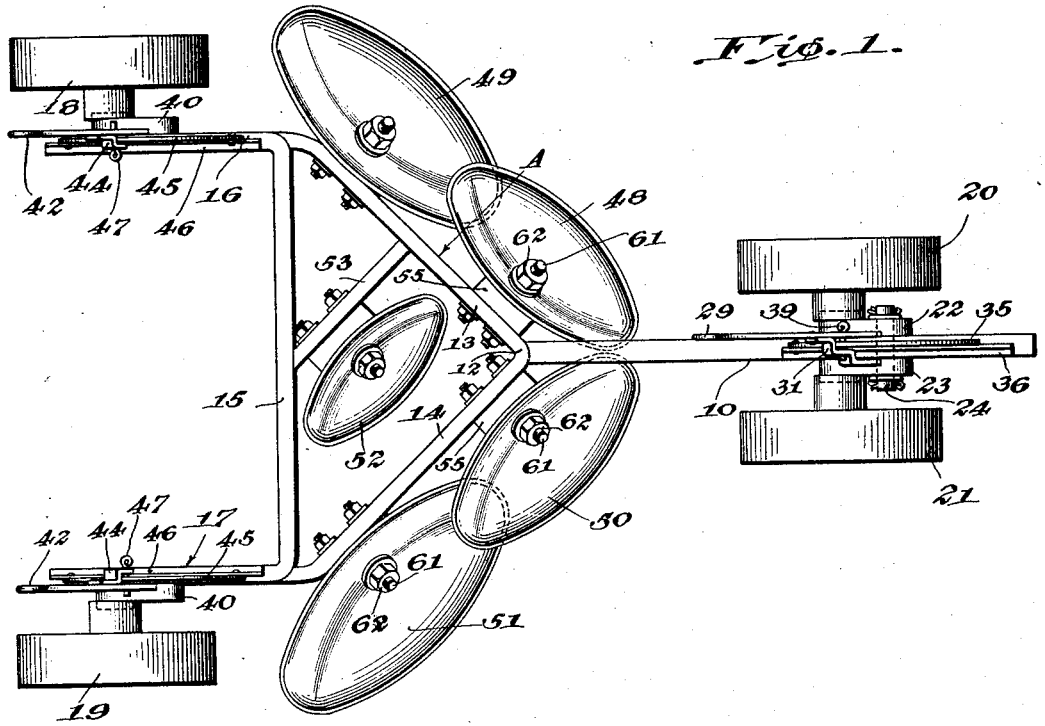
Figure 1 is a top plan view of an embodiment of the invention.
Figure 2:
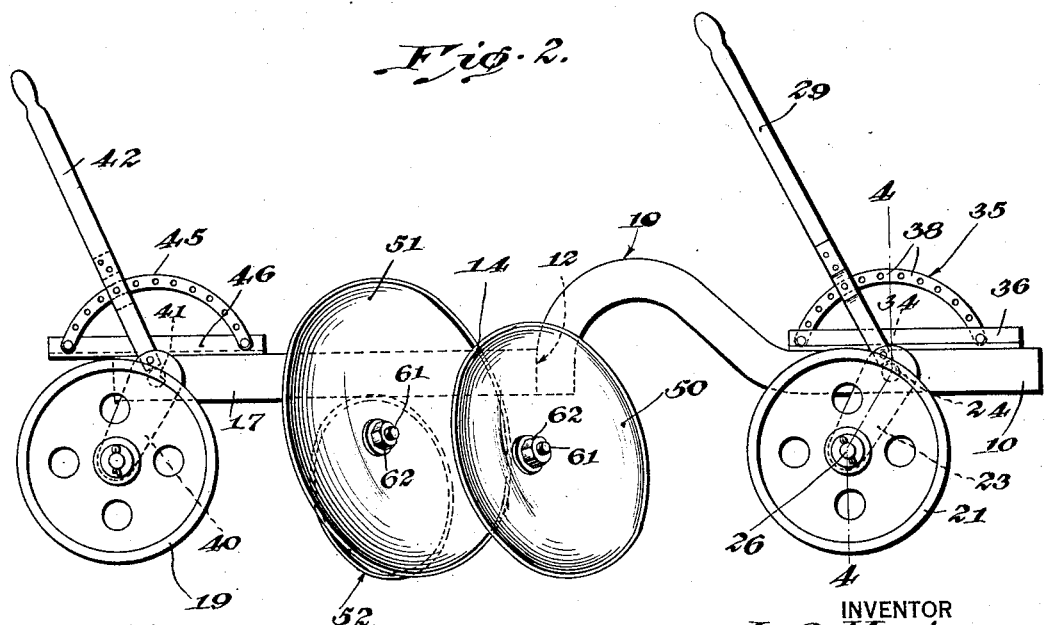
Fig. 2 is a side elevation thereof.

Referring now to the drawings in detail, in which like numerals refer to like parts throughout the same, A indicates the frame of the plow. The frame A includes a longitudinally extending beam or draw bar 10, the forward end of which will be provided with a means for attachment to a draft device (not shown). The beam 10 terminates rearwardly in a downwardly extending end portion 11 which is secured by welding or any other suitable manner as at 12 to the forward portion of the main body portion of the frame A. The main body portion of the frame comprises two diagonally extending side bars 13 and 14 which diverge rearwardly from the point 12 and at obtuse angles to the beam 10. The bars 13 and 14 are preferably formed integral from a single length of metal, bent to an angle of approximately 90 degrees as clearly shown in Fig. 1.

The rearward terminus of each of the side bars 13 and 14 is welded or otherwise secured adjacent the ends of a transversely extending cross bar 15. The cross bar 15 terminates at either end in rearwardly extending bar portions 16 and 17, each of which carry the rear wheels 18 and 19 respectively. The front wheels 20 and 21 of the plow are carried at the forward portion of the beam 10 and are set close together.

For mounting the front wheels to provide for vertical adjustment of the beam 10 with respect to the ground line, a pair of depending arms 22 and 23 are pivotally mounted on either side of the beam 10 by means of a transversely extending pin or rod 24 which passes through the beam 10. The wheels 20 and 21 are mounted on stud shafts 25 and 26 carried at the free end of the arms 22 and 23 respectively. For the purpose of preventing dirt working into the hubs of the wheels, a socket 27 is formed in the inner end of each hub, the sockets being sized to closely fit over and receive a circular boss 28 formed with the arms 22 and 23.

The arms 22 and 23 are adjusted and locked in position by means of a lever 29, the inner end of which is received in a socket 30 in the arm 22. A double offset bracket 31 is rivetted to the lever 29 as at 32 and terminates in a vertically extending offset portion 33 which is received within a socket 34 in the arm 23. It will be obvious that movement of the lever 29 in either longitudinal direction will result in raising or lowering of the beam 10. An upstanding perforated quadrant 35 bolted to an angle iron 36 which is spot welded to the top of the beam 10, is received between the lever 29 and offset bracket 31, the arm 29 and bracket 31 being provided with registering openings 37 adapted to register with the perforations 38 in the quadrant to lock the lever 29 and thus the beam 10 in adjusted position.

The rear wheels 18 and 19 are mounted in much the same manner as the front wheels except that they are individually adjustable. A description of the mounting of the wheel 18 will suffice for both of the rear wheels. As shown in Fig. 6, an arm 40 is pivotally secured to the rearwardly extending frame bar 16 by means of a pin 41. The arm 40 carries a stub shaft for mounting the wheel 18 and the rear wheel mountings also include the dirt exclusion feature, the same as the front wheels.

The adjustment and locking of the rear wheel carrying crank arms 40 is substantially the same as that for the front wheels. An operating lever 42 has one end received in the socket 43 in the arm 40 and is provided with an offset bracket 44 which straddles the perforated quadrant 45 which is bolted to angle iron 46. The angle iron is preferably welded to the top of the bar 16. A locking pin 47 passing through the bracket 44, quadrant 45 and lever 42 serves to lock the adjusting lever in any desired position.

A pair of rotatable concavo-convex cutting and scraping disks 48 and 49 are mounted upon the bar 13 in overlapping relationship, the disk 49 being slightly larger than the disk 48. A pair of disks 50 and 51, similar to the disks 48 and 49 are mounted upon the bar 14. The disks are mounted with their concave faces forwardly directed at substantially the same angle to the longitudinal center line of the apparatus as are the bars 13 and 14. The axis of the disks are also rearwardly inclined from the horizontal so that the ground engaging portion of the disks will have a shovel-like action during the operation of the device.

A centrally disposed disk 52 is mounted upon a diagonal bar 53 which extends between the bars 13 and 15 and is substantially parallel with the side bar 14, the purpose of this central disk is to take out the ridge of material which may be left between the area cleared by the disks 48 and 50.

I have provided a novel form of bearing support for rotatably mounting the respective disks in operative position on the bars 13, 14 and 53, the bearings for all of the disks being identical and interchangeable. Referring particularly to Fig. 5, the bearing support comprises a bearing box 54 which includes a vertical portion 55 which is bolted to the vertical forward face of the bar 14, for example. The box 54 includes an angularly depending hub portion 56 which projects slightly forwardly of the portion 55 and is provided with a tapered bore 57. A concave plate or seat element 58 is formed integrally with a tapered spindle member 59 which is seated within the tapered bore 57 and which extends substantially centrally from the rear face of said plate 58. A suitable bushing 60 may be interposed between the walls of the bore 57 and the spindle 59.

A tie bolt 61 extends centrally through the spindle 61 and plate 58 and projects from the concave face of the latter. The appropriate disk such as 50 is seated on the concave face of the plate 58 which is shaped to conform to the shape of said disks and is secured in position by a nut 62 which is received on the threaded end of said bolt. The other end of the tie bolt extends beyond the small end of the spindle and a circular boss 63 which is formed with the hub 56 and which surrounds the small end of the bore 57. A suitable nut 64 and washer 65 received on the threaded end of said bolt, bear against the boss 63 and serve to draw the spindle tightly into the bore as will readily be understood.

The outer face of the hub 56 is formed with an annular boss 66 which surrounds the outer and larger end of the bore 57 and the plate 58 is formed with an annular flange 67, spaced from and surrounding the spindle 59. The annular flange 67 is of such size as to fit over the boss 66 when the parts are in assembled relation so as to form a guard to prevent the entrance of dirt and foreign matter to the bearing. Furthermore the annular recess 68 formed between the flange 67 and spindle 59 forms with the boss 66 a thrust bearing which considerably relieves the strain and wear on the tapered bearing. A cap 69 is shrunk onto the boss 63 and protects and closes the other end of the bearing.

A conventional grease cup or pressure fitting 70 is carried by the hub 56, and through which grease or other lubricant may be forced into the bearing.

In operation, the plow is connected by means of a chain or other flexible element, to the drawbar of a tractor or the like, and the levers 29 and 42 are adjusted to allow the disks to penetrate the desired distance below the ground line. As the device is drawn forwardly, the disks act upon the vegetation and earth with a combined cutting and scraping action, discharging the loosened earth and vegetation to one side and leaving a cleared lane of any desired width, depending on the number and size of disks used. By using a flexible connection between the beam 10 and the draft device, the plow is permitted to shift bodily to one side or the other in case the disks encounter a particularly solid obstruction, thereby relieving the parts of undue strain and reducing to a minimum the chances of breakage of the parts.

It will of course be understood that only one disk may be employed on either side of the frame or that an even greater number may be added, depending upon the width desired in the cleared line and upon the amount of power available to draw the apparatus.

It will also be understood that the device may be used for many purposes other than the production of fire-lines, such as the clearing of land for plowing, the production of drainage ditches and many other uses which are too numerous to mention.

Other modifications in the details of construction of the invention may also be made without departing from the spirit of the invention as defined by the appended claims.

I claim:

1. In a clearing plow, a frame including a centrally disposed longitudinally extending beam, a pair of side bars having their forward ends secured to said beam and diverging rearwardly in opposite directions therefrom, a pair of upstanding rearwardly inclined rotatable ground engaging disks carried by each of said bars, said disks being spaced along said bars, the edges of the foremost disk of each pair being substantially in contact but spaced to permit clearance at approximately the center line of the plow, said disks being curved to throw the dirt outwardly.

2. In a clearing plow, a frame including a centrally disposed longitudinally extending beam, a pair of side bars having their forward ends secured to said beam and diverging rearwardly in opposite directions therefrom, a pair of upstanding rearwardly inclined rotatable ground engaging disks carried by each of said bars, said disks being spaced along said bars, the edges of the foremost disk of each pair being disposed in close relationship at approximately the center line of the plow, and an upstanding ground engaging disk supported centrally of said plow and between said rearwardly diverging side bars.

3. In a clearing plow, a frame including a centrally disposed longitudinally extending beam, a pair of side bars having their forward ends secured to said beam and diverging rearwardly in opposite directions therefrom, a pair of upstanding rearwardly inclined rotatable ground engaging disks carried by each of said bars, said disks being spaced along said bars in parallel relationship therewith, the edges of the foremost disk of each pair being substantially in contact but spaced to permit clearance at approximately the center line of the plow, said disks being curved to throw the dirt outwardly.

LEVI C. HESTER.